No. 869,564. PATENTED OCT. 29, 1907.
S. W. HARRELL.
PRESERVING AND CANNING DEVICE.
APPLICATION FILED JAN. 28, 1907.

Inventor
S. W. Harrell.

Witnesses
C. N. Walker
M. R. Meacham.

By Attorneys

UNITED STATES PATENT OFFICE.

SARAH WARNER HARRELL, OF AMITE, LOUISIANA.

PRESERVING AND CANNING DEVICE.

No. 869,564.　　　　　Specification of Letters Patent.　　　Patented Oct. 29, 1907.

Application filed January 28, 1907. Serial No. 354,627.

*To all whom it may concern:*

Be it known that I, SARAH WARNER HARRELL, a citizen of the United States, residing at Amite, in the parish of Tangipahoa and State of Louisiana, have invented certain new and useful Improvements in Preserving and Canning Devices, of which the following is a specification.

This invention relates to preserving or canning devices.

One object of the invention is to provide a device constructed and arranged for disposition within a fruit jar or can to force the heavy substance toward the bottom of the jar or can and the juice or liquid substance to the top thereof, and thereby overcome any tendency of molding or decaying of the fruit or other commodity confined within the jar or can.

Another object of the invention is to provide an exceedingly simple, inexpensive, durable and efficient device of the character described.

With the above and other objects in view, the present invention consists in the combination and arrangement of parts hereinafter more fully described, illustrated in the accompanying drawings, and particularly pointed out in the appended claims.

Figure 1:
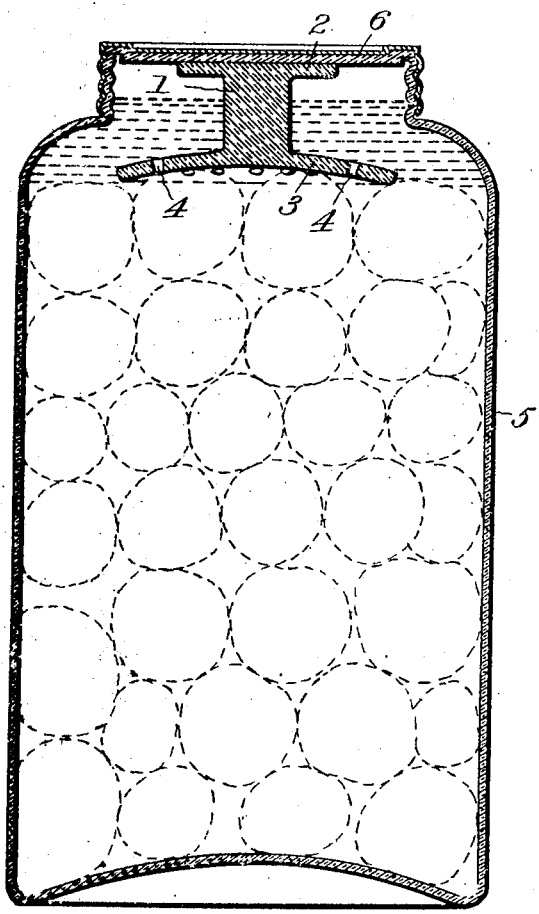
Figure 2:
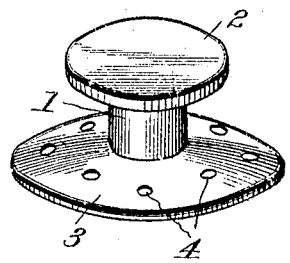
Figure 3:
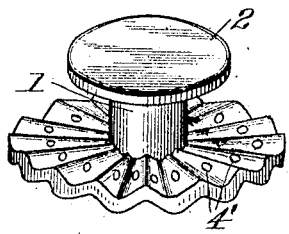

In the drawings: Figure 1 is a vertical sectional view of a jar or other vessel, illustrating my invention in perspective and also showing the heavier material forced toward the bottom of the vessel and the juice or lighter material near the top thereof. Fig. 2 is a detail perspective view of a modified form of the invention; and Fig. 3 is a detail perspective view of a modified form of the invention.

Referring now more particularly to the accompanying drawings, the reference character 1 indicates a solid shank provided at one end with an enlargement or head 2 and at its opposite end with a concavo-convex base 3 provided with any desired number of perforations 4. If so desired, the base may be formed concavo-convex and corrugated with the perforations 4' formed in the sides of the corrugations as shown in Fig. 3. In any event, the device is preferably formed of a single piece of glass, porcelain or other suitable material, porcelain preferred.

In the use of my invention the jar or can 5 is first filled with the fruit or other canning substance and the device placed upon the top of the same. The cover 6 of the jar or can is then screwed or otherwise forced upon the jar, and by reason of the cover engaging the head 2 of the device, the latter is forced down upon the commodity causing the juice or liquid to pass through the perforations of the base and remain upon top of the commodity, thereby preventing molding and decaying of the commodity so common after commodities are jarred or canned.

What is claimed is:

1. The combination with a jar and a closure therefor; of means confined within the jar for pressure upon the contents of the latter composed of a single piece of solid material including a shank provided at one end with a perforated base and at its opposite end provided with a head of smaller diameter than the base, said pressure means being free of the closure of the jar.

2. A device of the character described composed of a single piece of solid material including a shank provided at one end with a corrugated perforated base and at its opposite end provided with a head portion.

In testimony whereof I affix my signature, in presence of two witnesses.

SARAH WARNER HARRELL.

Witnesses:
　H. P. MCCLENDON,
　J. J. LAUTIER.